US012567165B2

(12) United States Patent　　(10) Patent No.: US 12,567,165 B2
Flanagan et al.　　(45) Date of Patent: Mar. 3, 2026

(54) CRITICAL DIMENSION MEASUREMENT IN 3D WITH GEOMETRIC MODELS

(71) Applicant: FEI Company, Hillsboro, OR (US)

(72) Inventors: John Flanagan, Hillsboro, OR (US); Mary Wu, Fremont, CA (US); Erik Franken, Nuenen (NL); Daniel Lichau, Merignac (FR)

(73) Assignee: FEI Company, Hillsboro, OR (US)

( * ) Notice: Subject to any disclaimer, the term of this patent is extended or adjusted under 35 U.S.C. 154(b) by 612 days.

(21) Appl. No.: 17/591,455

(22) Filed: Feb. 2, 2022

(65) Prior Publication Data

US 2023/0245334 A1　　Aug. 3, 2023

(51) Int. Cl.
*G06T 7/62* (2017.01)
*G06F 30/20* (2020.01)
*G06T 17/10* (2006.01)
*G06F 111/10* (2020.01)

(52) U.S. Cl.
CPC ............... *G06T 7/62* (2017.01); *G06F 30/20* (2020.01); *G06T 17/10* (2013.01); *G06F 2111/10* (2020.01)

(58) Field of Classification Search
CPC . G06T 7/62; G06T 17/10; G06T 2207/10061; G06T 7/0004; G06T 2207/30148; G06T 17/00; G06T 7/60; G06T 7/001; G06T 7/11; G06F 30/20; G06F 2111/10; G06F 30/23; G06F 30/27; G01B 11/24; G01B 11/00
See application file for complete search history.

(56) References Cited

U.S. PATENT DOCUMENTS

| | | | |
|---|---|---|---|
| 8,233,155 B2 | 7/2012 | Kiers et al. | |
| 9,076,688 B1 | 7/2015 | Lutz et al. | |
| 9,208,609 B2 * | 12/2015 | Taguchi | ................... G06T 17/00 |
| 9,436,987 B2 * | 9/2016 | Ding | ......................... G06T 7/11 |
| 2015/0198434 A1 * | 7/2015 | Chen | ...................... G01B 11/02 |
| | | | 702/155 |

(Continued)

FOREIGN PATENT DOCUMENTS

| | | |
|---|---|---|
| CN | 104662543 A | 5/2015 |
| CN | 107924852 A | 4/2018 |

(Continued)

OTHER PUBLICATIONS

Bodermann et al., "OCD Metrology for Advanced Lithography," *Physikalisch-Technische Bundesanstalt Braunschweig und Berlin Nationales Metrologieinstitut*, 35 pages (Mar. 22, 2017).

(Continued)

*Primary Examiner* — Bobbak Safaipour
(74) *Attorney, Agent, or Firm* — Klarquist Sparkman, LLP

(57) ABSTRACT

Methods include acquiring a series of images or spectra of a volume of a model sample, reconstructing a 3D image of the volume of the model sample using the series of images, constructing a 3D model of the volume of the model sample by forming a segmentation of the reconstructed 3D image and fitting one or more primitive geometrical shapes to the segmentation, acquiring test sample images or spectra, and measuring test sample critical dimensions using the constructed 3D model to guide analysis of test spectra or images. Additional methods and related systems are disclosed, optical critical dimension (OCD) methods and systems.

9 Claims, 10 Drawing Sheets

(56)  References Cited

U.S. PATENT DOCUMENTS

| | | | |
|---|---|---|---|
| 2015/0317821 A1 | 11/2015 | Ding et al. | |
| 2019/0286787 A1* | 9/2019 | Chouaib | G06F 30/17 |
| 2019/0393016 A1 | 12/2019 | Machavariani et al. | |
| 2020/0294829 A1 | 9/2020 | Machavariani et al. | |
| 2021/0090244 A1 | 3/2021 | Brill | |
| 2021/0366686 A1* | 11/2021 | Winkler | H01J 37/04 |
| 2021/0373444 A1* | 12/2021 | Mueller | G03F 7/70625 |
| 2023/0245334 A1* | 8/2023 | Flanagan | G06T 7/0004 |
| | | | 382/100 |
| 2023/0401690 A1* | 12/2023 | Brill | G03F 7/70625 |

FOREIGN PATENT DOCUMENTS

| | | |
|---|---|---|
| CN | 110506236 A | 11/2019 |
| CN | 111971551 A | 11/2020 |
| CN | 113160381 A | 7/2021 |

OTHER PUBLICATIONS

Schmidt et al., "OCD enhanced: implementation and validation of spectral interferometry for nanosheet inner spacer indentation," *Proceedings of SPIE*, 11611:116111U-1-116111U-11 (Mar. 5, 2021).
Sohail et al., "Optical scatterometry for process metrology," *Proceedings of SPIE, Optical Metrology: A Critical Review*, 10294:1029407-1-1029407-16 (Jul. 19, 1999).

* cited by examiner

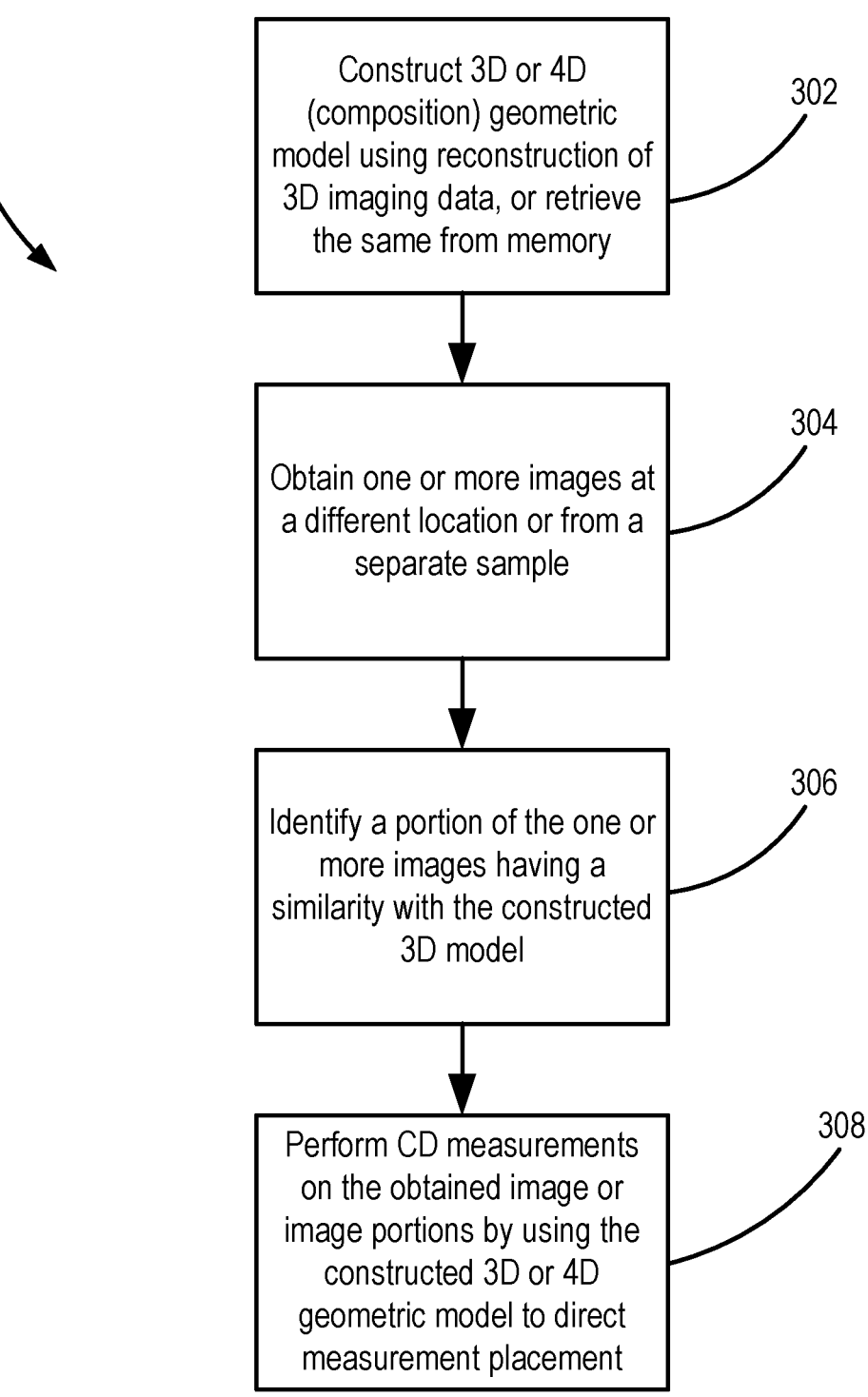

302

Construct 3D or 4D (composition) geometric model using reconstruction of 3D imaging data, or retrieve the same from memory

304

Obtain one or more images at a different location or from a separate sample

306

Identify a portion of the one or more images having a similarity with the constructed 3D model

308

Perform CD measurements on the obtained image or image portions by using the constructed 3D or 4D geometric model to direct measurement placement

FIG. 3

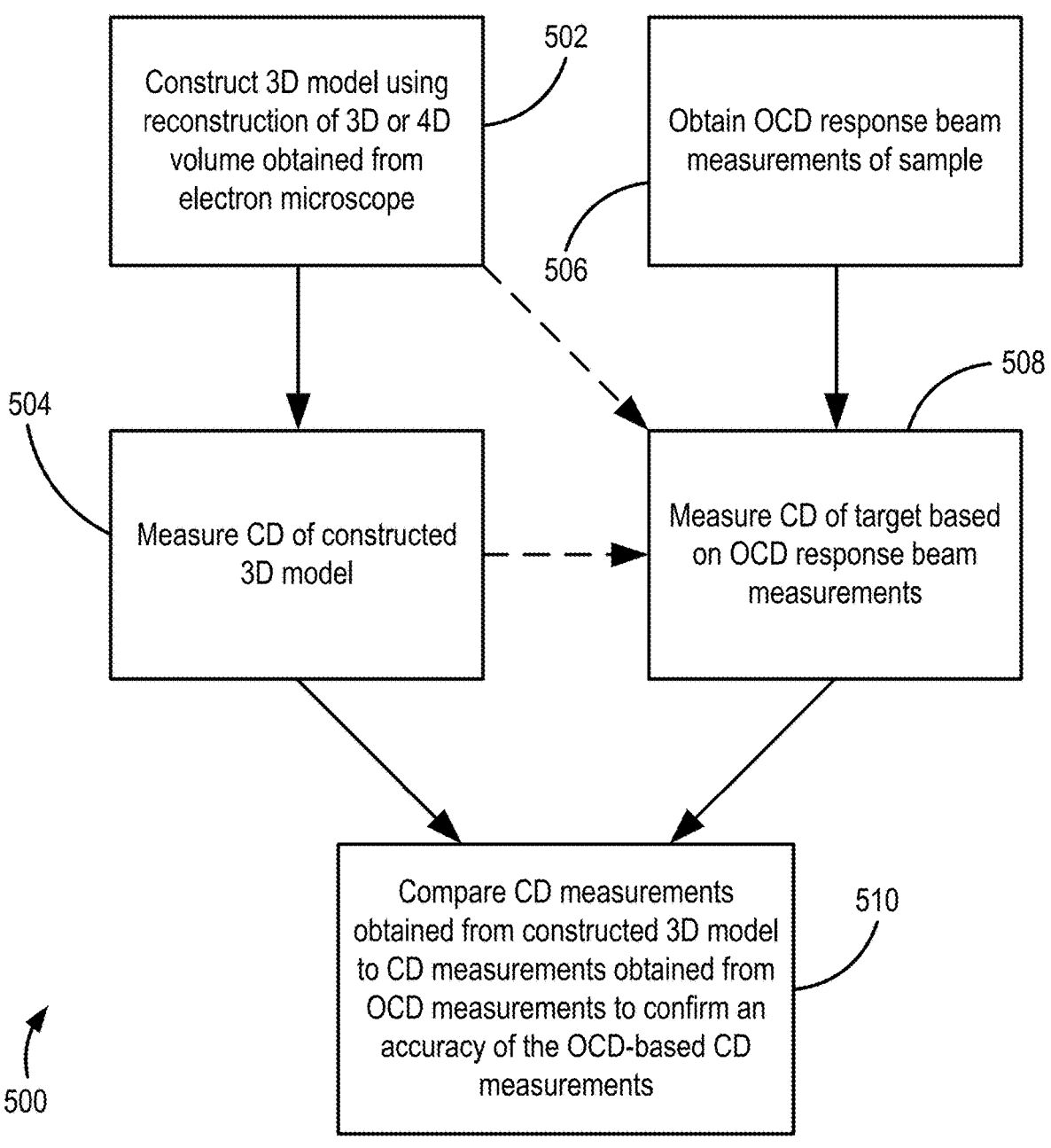

502 Construct 3D model using reconstruction of 3D or 4D volume obtained from electron microscope

506

Obtain OCD response beam measurements of sample

508

504 Measure CD of constructed 3D model

Measure CD of target based on OCD response beam measurements

510 Compare CD measurements obtained from constructed 3D model to CD measurements obtained from OCD measurements to confirm an accuracy of the OCD-based CD measurements

+60° tilt

602

-60°

608

606 tilt-series images tomographic reconstruction

610

CRITICAL DIMENSION MEASUREMENT IN 3D WITH GEOMETRIC MODELS

FIELD

The field is critical dimension (CD) measurements.

BACKGROUND

Semiconductor manufacturing requires increasingly precise critical dimension (CD) metrology and material composition measurements of various small structures made in semiconductor device manufacturing and explored through research and development. Critical dimensions of such structures can include depths of trenches, pitch of repeat structures, side-wall angles, and underlying thin film thickness, etc. These measurements are provided by OCD, CD-SEM, (S)TEM, FIB-SEM, EDS, and other methods. (S)TEM are direct imaging techniques, capable of the highest resolutions and therefore generally considered the best quality among direct imaging techniques for obtaining CD measurements of individual signature. However, the throughput of (S)TEM is low, and the sample preparation requires a destructive process. Since high-throughput and non-destructive methods are required for in-line metrology in modern semiconductor manufacturing, (S)TEM have been used as reference metrology. Optical Critical Dimension (OCD) approaches and CD-SEM have been adopted as in-line metrology solutions. As device sizes continue to shrink and move towards 3D architecture, CD-SEM can only provide limited metrology data. OCD can provide fast, in-line and 3D metrology solutions. However, as any model-based optical metrology technique, OCD relies on the accuracy and reliability of the model. The traditional way to build an intensive OCD model is based on physical calculations and regression analysis of a large number of spectra. Then the measured spectrum is compared to the simulated spectra from the model to find the best fit. To improve OCD measurement accuracy and reliability, CD-SEM, (S)TEM measurements and the results from other technologies are fed into an OCD tool to validate the model. With n & k confinement in nanoscales, surface and edge roughness, small deviation in material composition and new 3d architecture from GAA and other advanced device processes, building an accurate and reliable model becomes very challenging, such as with increasing parameter correlations and ambiguity issues. This requires massive computational power (cost) and lengthy time to solutions. Machine Learning (ML) can offer faster solutions by trial and error with feedback loop to learn. but ML is fundamentally limited by data quality.

Thus, a need remains for improved OCD measurement time to quality solutions by accurate and reliable 3D modeling using direct dimension and material composition measurement results.

SUMMARY

According to an aspect of the disclosed technology, methods include acquiring a series of images or spectra of a volume of a model sample, reconstructing a 3D image of the volume of the model sample using the series of images, constructing a 3D model of the volume of the model sample by forming a segmentation of the reconstructed 3D image and fitting one or more primitive geometrical shapes to the segmentation, acquiring test sample images or spectra, and measuring test sample critical dimensions using the constructed 3D model to guide analysis of test spectra or images. Some method examples include comparing the measured critical dimensions with CD measurements of the constructed 3D model to verify direct CD measurement accuracy. Some method examples include measuring critical dimensions, shape, profile, and composition of the model sample from the series of images or spectra by measuring dimensions of the constructed 3D model. In some examples, the acquiring the series of images or spectra of the volume of the model sample comprises, for each image of the series, adjusting parameters of an imaging beam at the model sample and/or parameters of a movement stage supporting the model sample and after each adjustment collecting the image with one or more image sensors.

According to another aspect of the disclosed technology, methods include constructing a 3D model of a volume of a model sample from a 3D image so as to form a constructed 3D model, acquiring optical critical dimension (OCD) spectrum of a test sample by directing an OCD probe beam to the test sample and detecting an OCD response beam, and comparing the acquired OCD spectrum with simulated OCD data to determine CD, shape, profile and composition of the test sample, wherein the simulated OCD data corresponds to simulated OCD response beam characteristics of an OCD probe beam directed to a shape corresponding to the constructed 3D model. Some examples further include performing an OCD simulation with a numerical solver to produce the simulated OCD data, using the constructed 3D model and associated parameters as inputs and constraints to the simulation. In some examples, the simulating includes numerically solving a system of equations based on rigorous coupled-wave analysis (RCWA), finite element modeling (FEM), and/or finite-difference time-domain method (FDTD). In some examples, the simulated OCD data comprises one of a plurality of numerically solved solutions iterated by varying one or more parameters of the 3D model. In some examples, the 3D image is obtained by acquiring a series of images or spectra of the volume of a model sample, and reconstructing a 3D image of the volume of the model sample using the series of images. In some examples, the constructed 3D model is obtained by forming a segmentation of the reconstructed 3D image and fitting one or more primitive geometrical shapes to the segmentation. Some method examples can include retrieving the constructed 3D model from an optical critical dimension (OCD) system library, and adjusting primitive geometrical shapes of the constructed 3D model to correspond with a structure of an OCD test sample.

According to another aspect of the disclosed technology, a 3D direct metrology measurement system includes a movement stage, a beam source configured to direct a beam to a model sample supported by the movement stage, a sensor configured to receive particles from the model sample, and a processor coupled to the movement stage and sensor, the processor coupled to or including code that, when executed by the processor, causes the system to acquire a series of images or spectra of a volume of the model sample, reconstruct a 3D image of the volume of the model sample using the series of images, construct a 3D model of the volume of the model sample by forming a segmentation of the reconstructed 3D image and fitting one or more primitive geometrical shapes to the segmentation, and measure critical dimensions of a test sample by acquiring one or more images of the test sample, identifying a portion of the one or more images of the test sample having a similarity with the constructed 3D model, and measuring critical dimensions (CD) of the test sample from the acquired images. In some examples, the processor is coupled to or includes code that, when executed by the processor, causes the system to measure critical dimensions of a test sample by acquiring one or more images and/or spectra of the test sample, identifying a portion of the one or more images having a similarity with the constructed 3D model, and measuring critical dimensions (CD), shape, profile and material composition of test sample from the acquired images and spectra. In some examples, the processor is coupled to or includes code that, when executed by the processor, causes the system to measure critical dimensions of the model sample at the location where the series of images and/or spectra was acquired by measuring dimensions of the constructed 3D model. In some examples, the processor is coupled to or includes code that, when executed by the processor, causes the system to retrieve the constructed 3D model obtained from an optical critical dimension (OCD) model library, and adjust the primitive geometrical shapes of the constructed 3D model to correspond with a structure of an OCD test sample.

According to another aspect of the disclosed technology, an optical critical dimension (OCD) measurement system includes a movement wafer stage, an OCD probe beam source configured to direct an OCD probe beam to a test wafer supported by the movement stage, a sensor configured to detect an OCD response beam from the test wafer, and an OCD processor coupled to the movement stage and sensor, the OCD processor coupled to or including code that, when executed by the OCD processor, causes the system to acquire optical critical dimension (OCD) data of the test wafer by directing an OCD probe beam to the test wafer and detecting an OCD response beam, and compare the acquired OCD data with simulated OCD data to determine critical dimensions, shape, profile and composition of the test wafer, wherein the simulated OCD data corresponds to simulated OCD response beam characteristics of an OCD probe beam directed to a shape corresponding to a constructed 3D model, wherein the constructed 3D model comprises an arrangement of one or more primitive geometrical shapes fitted to a segmentation of a reconstructed 3D image. In some examples, the processor is coupled to or includes code that, when executed by the processor, causes the system to perform an OCD simulation with a numerical solver to produce the simulated OCD data, using the constructed 3D model and associated parameters as inputs and constraints to the simulation. In some examples, the simulating includes numerically solving includes numerically solving a system of equations based on rigorous coupled-wave analysis (RCWA), finite element modeling (FEM), and/or finite-difference time-domain method (FDTD).

According to further aspects of the disclosed technology, computer readable storage media including stored processor-executable instructions configured to perform any of the method examples described herein.

The foregoing and other objects, features, and advantages of the disclosed technology will become more apparent from the following detailed description, which proceeds with reference to the accompanying figures.

BRIEF DESCRIPTION OF THE DRAWINGS

FIG. 1 is a flowchart showing example methods of improving critical dimension (CD) measurement performance.

FIG. 3 is a flowchart of a method of using constructed 3D models to improve CD metrology.

FIG. 5 is a flowchart of methods of linking constructed 3D models obtained through direct CD with OCD methods and systems.

DETAILED DESCRIPTION

Overview of Improved CD Techniques

In accordance with disclosed examples of the technology, many of the above noted problems with direct and indirect Critical Dimension (CD) measurement techniques can be solved by constructing 3D models from 3D images obtained through direct imaging methods and using the constructed geometric 3D models to interpret OCD and/or 3D (or 4D with material composition characteristics) volumetric data. That is, by using at least three rather than two dimensions, both OCD configuration processes and direct metrology measurement processes can be improved. Furthermore, disclosed hybrid examples can include a linkage between direct and OCD processes to ensure consistency between these measurement modalities.

In disclosed hybrid metrology examples, 3D or 4D volumetric data is used to generate a 3D geometric model, which is then used as a model to generate spectra to compare with the measured spectrum from Optical Critical Dimensions (OCD), especially for new process layers in the new 3D architecture. 3D models can be constructed from 3D image reconstructions obtained through direct 3D imaging techniques, such as electron tomography, EDS, slice-and-view, through-focus, etc. In many examples, a 3D model constructed from 3D imaging data can be used as both the model to fit as well as to provide the geometric and/or composition parameters to constrain an OCD fit. The OCD fitting problem is ill posed and needs constraints to obtain an acceptable fit. The constructed 3D models can be used in the OCD process as the model for fitting OCD spectroscopy data to, as well as to provide the parameter set for parametric fitting. The parameter set can be specified by the model and these independent variables are used to describe data. For example, the OCD data can be calculated from the model and then the model parameters can be varied until the calculated OCD matches the real OCD, similar to a linear regression in which 'a' and 'b' are varied in 'y=mx+b' to fit a dataset. The 3D model and CD measurements associated with it can also be used as the parameter constraints used to narrow or refine the selection of matching simulated OCD data or the quantity and characteristics of simulation iterations that are numerically solved to best fitting.

Figure 6A:
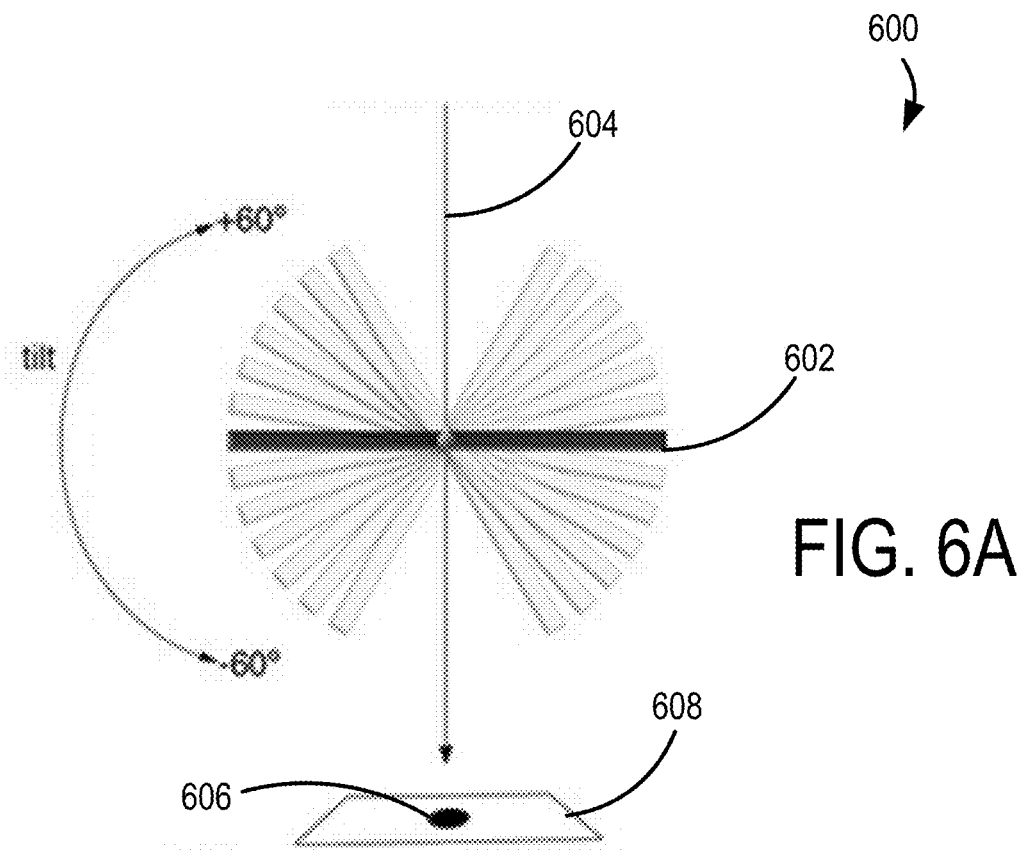
FIGS. 6A-6B are side perspective views of tomographic methods.
Figure 6B:
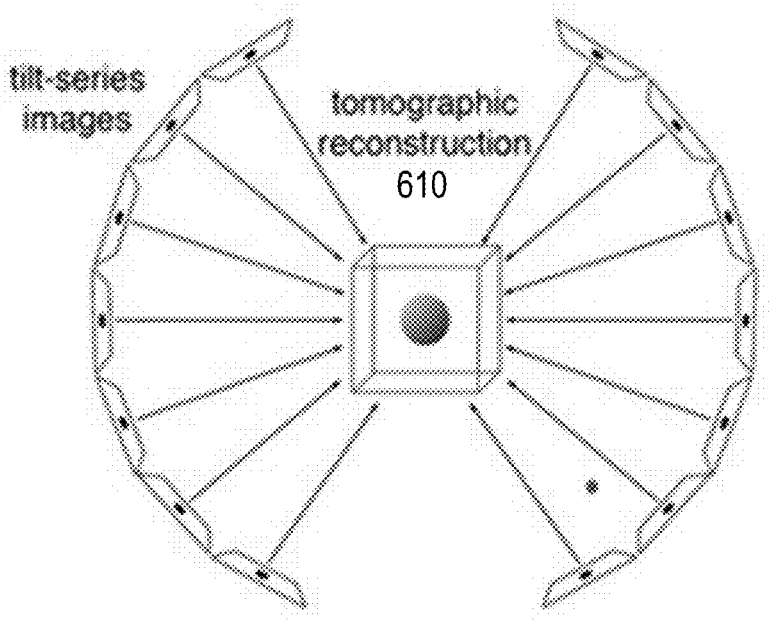

In many examples, the constructed 3D models can also serve to interpret further volumetric data, e.g., volumetric data obtained through various direct 3D imaging techniques such as electron tomography, EDS, slice-and-view, through-focus, etc. As semiconductor devices become more three dimensional, such as with 3D NAND, Gate-All-Around (GAA), etc., metrology of such devices can benefit from the improved association between their three-dimensional characteristics and the 3D imaging techniques which more accurately capture their features. Further, metrology performed in 3D rather than in 2D and reconstructing the 3D measurements from 2D slices can ease the burden of sample preparation and metrology workflow. By way of example, an image of a single 3D volume can be obtained rather than demanding high accuracy cut placements for multiple 2D views. FIGS. 6A-6B shows an example approach 600 to electron beam tomography. A sample 602 is rotated through various tilt angles and an electron beam 604 is transmitted through the sample at each tilt position before forming an image 606 at a sensor 608. A tomographic 3D image reconstruction 610 is obtained from the obtained series of images.

Variations to standard tomography approaches may also be used. In some approaches, a sample tilts for imaging in an evenly distributed angular fashion over an entire possible tilt range, for example but not limited to steps of 0.5 to 3 degrees. Images can be obtained by scanning with a focused probe beam (e.g., in STEM mode) or by using a camera while illuminating an entire field of view with a larger probe beam (e.g., in TEM mode).

To increase the speed of the tomographic image collection process, various enhancements can be applied, which can be referred to as "sparse scanning tomography" techniques. In some examples, images are acquired at a limited or truncated number of angles (for example but not limited to −3 to 7), i.e., "sparse angle tomography". By including prior knowledge of characteristics of the sample into a corresponding tomographic image reconstruction algorithm, 3D reconstructions can be obtained with the limited amount of projection information. An alternative "sparse scanning tomography" technique includes dynamically adjusting the scanning pattern, while scanning over the field of view, depending on detected features of interest. Another approach can include "continuous tilt tomography" where a movement stage supporting the sample is continuously tilted at a constant tilt speed, while simultaneously camera or detector data is acquired very quickly. Such approaches can reduce the time needed for data collection, e.g., by eliminating time delays associated with the starting and stopping of the rotating stage and delays required for stabilization due to mechanical drift, along with overhead to start and stop the imaging process. Some sparse tomographic processes can be particularly suitable with pillar shaped samples where tilt constraints associated with planar samples are absent.

Figure 1:
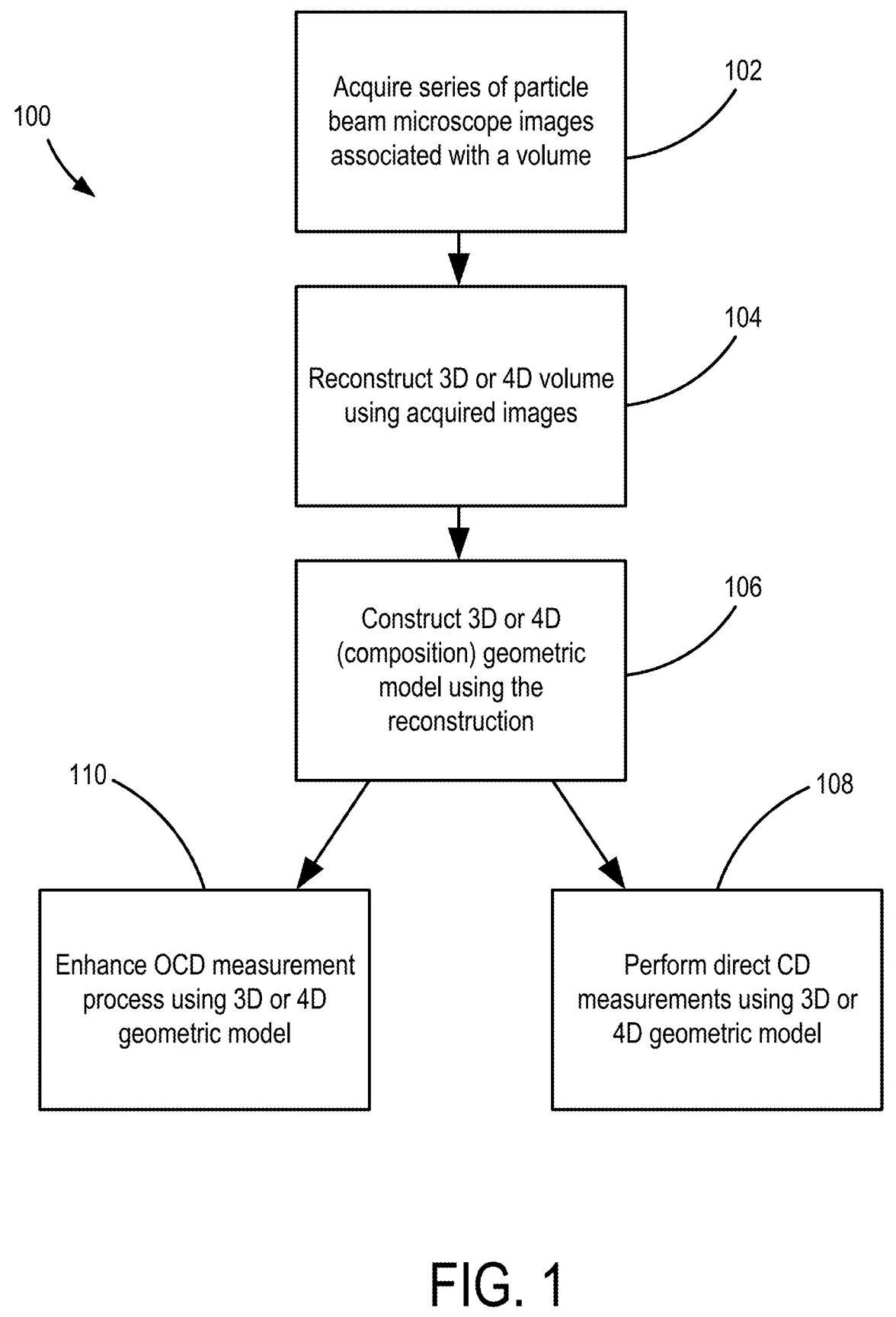

FIG. 1 shows a method 100 that can be used for improving CD measurement performance. At 102, a series of images is obtained for a target volume using a particle beam microscope, such as a TEM, STEM, FIB dual beam, or SEM. The images are typically acquired sequentially by adjusting microscope imaging parameters, such as focus, deflected beam position, movement stage translational and/or rotational position (e.g., a movement wafer stage), sensor timing, etc. In a specific TEM example, with a lamella sample mounted on a movement stage, each image of a series can be obtained by adjusting parameters of an electron beam arriving at the sample and/or parameters of the movement stage supporting the sample, directing the electron beam to the sample, detecting transmitted electrons with an electron imaging sensor, and repeating the process with small adjustments to the beam and/or stage parameters.

Various imaging sensors may be used to detect particles of interest, including CMOS sensors, CCD sensors, BSE detectors, PMTs, EELS sensors, flat panel detectors, position sensitive (PoS) detectors, etc. configured to detect selected particles, including transmitted electrons, scattered electrons, x-rays, photons, ions, etc. The imaging parameters and image series obtained using the imaging parameters are associated with a compatible 3D imaging technique, such as computed tomography, EDS, slice-and-view, confocal, through-focus, atom probe tomography (APT), etc., where the series of images can be reconstructed into a 3D volumetric image. In another example, a 3D sample volume is produced via Focused Ion Beam (FIB) milling to yield a pillar shaped lamella. Pillar shapes generally do not suffer from tomography induced missing wedge artifacts. Furthermore, they are relatively FIB damage free because the milling area is not adjacent to the area of interest. In further examples where the acquired data includes EDS or EELS, the volume can become 4D by the addition of material composition details. Composition information can also be obtained through other detection modalities or can be known a priori.

At 104, the obtained image series is stored in a computer memory and a computing processor is used to reconstruct the volume using one or more reconstruction algorithms suitable for the acquired image series. For example, where the series of images contains a stack of planar images, various tomographic reconstruction algorithms may be used, including filtered back projection, iterative reconstruction, Fourier domain reconstruction, fan beam reconstruction, and/or deep learning convolutional neural networks, by way of example.

At 106, a 3D model is constructed using the 3D image reconstruction obtained at 104. For example, the 3D image reconstruction can be analyzed using a surface segmentation algorithm configured to determine external and/or internal surface extents of the 3D image reconstructions. To provide the segmentation or after the segmentation, the volume can be loaded into a 3D metrology package (such as "Avizo") where the user can construct a 3D geometric model by fitting geometric primitives to the 3D segmented volume.

In some examples, volume surface segmentation can be achieved through machine learning or classical techniques such as isosurfaces. The segmentation surfaces identified through the surface segmentation process can be further refined by fitting a surface edge normal to the intensity gradients. The point clouds extracted from the surface can be used to fit the geometric primitives. In many examples, the primitives can be either user defined or obtained from a CAD model or GDS (graphic design system) file. Example primitive geometrical shapes can include cubes, parallelepipeds, cylinders, conics, spheres, or shapes with various cross-sectional features (e.g., trapezoidal, square, curved, etc.). In further examples, a library of geometric primitives can be automatically fit to the segmented 3D volume using a CAD meshing algorithm. To be useful for OCD, precise material composition is needed, and in various examples material composition can be known a-priori or obtained directly, as with 4D volumetric data. In 4D volumetric data examples, the detection modality corresponding to the series of images or an additional correlated detection modality can provide composition information at different positions of the 3D volume.

The constructed 3D model can be used in various ways to enhance CD measurements. At 108, separately or in conjunction with OCD enhancement at 108, the constructed 3D model can be used to perform direct CD measurements, including on the 3D model itself as well as by using the 3D model as measuring stick to compare against other images or related direct CD measurements obtained for other sample imaging locations. At 110, in many examples discussed further herein, the constructed 3D model can be used to enhance an OCD measurement process. For example, after the 3D geometric model is prepared it can be used to interpret OCD data and enhance the throughput of further 3D volumes by allowing, for example, sparse scanning and collection of fewer data points. Other high-throughput techniques may be used, including continuous-tilt tomography and sparse-angle tomography/Constructed 3D models can also be used as a scaffold to interpret further 3D volumes by fitting the model to new volumes, thereby allowing automatic extraction of metrology critical dimensions.

Direct CD Examples

Figure 2:
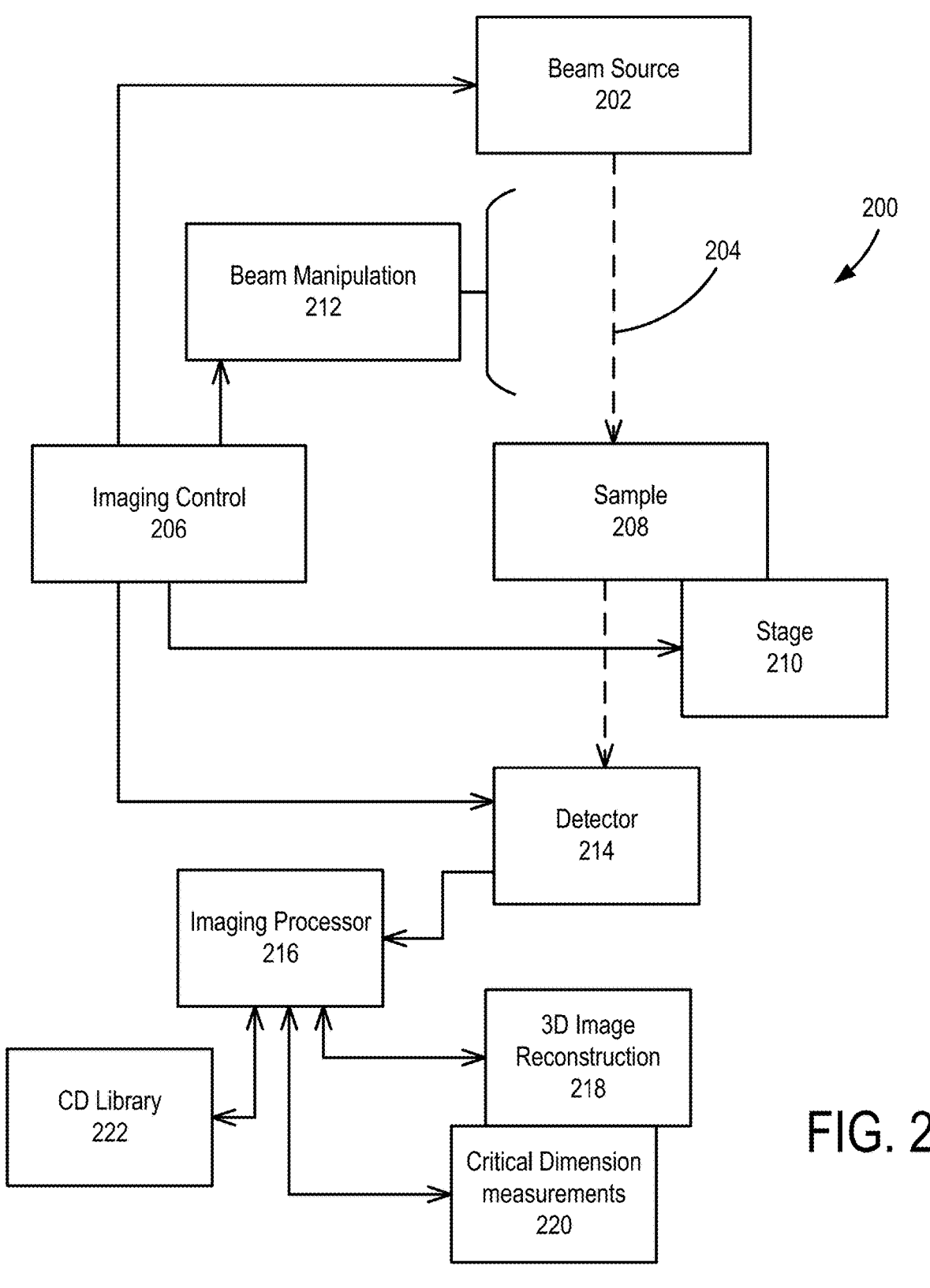
FIG. 2 is a schematic of a microscope that can be used for 3D imaging.

FIG. 2 is an electron microscope 200, such as a TEM, that can be used to implement various 3D imaging techniques and/or direct CD approaches described herein. It will be appreciated that other direct measurement instruments can be used, and the following description can pertain to such other direct measurement instruments. Additional instruments can include modifications to or differ from the following description, e.g., where imaging or measuring is obtained through alternative inspection beam or detection modalities.

The microscope 200 typically includes a beam source 202 configured to produce an electron (or other particle) beam 204 in response to an imaging control 206. For example, the imaging control 206 can control timing of the beam source 202 such as an initiation and/or cessation of an emission or beam pulsing. A sample 208 is coupled to a movement stage 210 (such as a movement wafer stage) and situated to receive the electron beam 204. The imaging control 206 is coupled to the movement stage 210 to control a positioning of the sample 208, such as a lateral X-Y position, vertical Z position, and/or tilt or angle position, in relation to the incident electron beam 204. An electron beam manipulation system 212 can include one or more lens components, beam deflectors, or other components configured to control a focus, position, or other characteristics of the electron beam 204 at the sample 208. A detector 214 is situated to receive transmitted, reflected, scattered, secondary electrons, photons, or other particles produced by the interaction between the sample 208 and the electron beam 204. An imaging processor 216 is coupled to the detector 214 to process detected image information, e.g., in response to a detection signal received from the detector 214.

In 3D imaging examples, the imaging processor 216 or another processor can be used to form a 3D image reconstruction 218 of the sample after a series of images are collected at different orientations and/or positions of the sample 208, e.g., based on electron tomography or another 3D imaging approach. In some examples, direct CD measurements can be performed with the microscope 200, or can be performed without the instrument having a 3D imaging capability. For example, the imaging processor 216 can be configured to process 2D imaging data or the 3D image reconstruction 218 and perform CD measurements on the image data. In some examples, the 3D image reconstructions 218, 3D models constructed using the 3D image reconstructions 218, and/or the CD measurements 220 can be included a CD library 222 accessible by the imaging processor 216 to perform comparisons between CD data associated with selected structures and newly gathered imaging data. In further examples, the imaging control 206 can be configured to automatically acquire image data from various portions of the sample 208 and perform CD measurements and/or comparisons, e.g., to directly sample numerous locations of the sample to verify critical dimensions at one or more steps of a semiconductor manufacturing process.

FIG. 3 shows a method 300 of using constructed 3D models to facilitate direct CD metrology. At 302, a 3D or 4D geometric model is constructed using a reconstruction of 3D imaging data, such as a tomographic reconstruction from a series of image slices of a model sample, or if the constructed 3D model has already been constructed, it can be obtained from memory, e.g., after subsequent image acquisition steps. At 304, one or more images, which can be 2D or 3D depending on the metrology approach employed, can be acquired for the sample used to generate the 3D model or for a different sample. For example, a particle beam can be directed to selected areas of a test sample for which CD metrology measurements are desired, and one or more images are acquired with an imaging sensor. In some instances, the obtained images can include multiple structures such that only a subset of the acquired image includes a structure of interest. Thus, at 306, portions of the images can be identified where the structure of interest has a shape or pattern similarity to the constructed 3D model. At 308, CD measurements can be performed on the obtained image or image portions using the constructed image to direct measurement placement. The model corresponding to the constructed image acts as a scaffold or template to direct CD measurements of newly obtained images. For example, if measurement of the critical dimensions of a cuboid is desired, then measurement of height, width, and depth are required, and the scaffold can direct where to make the measurements. Furthermore, the constructed model can act as a constraint for sparse scanning and sparse tomography techniques accelerating obtainment of 3D images. Sparse scanning and sparse tomography involve collecting fewer data points than otherwise necessary. This is enabled by adding constraints that "fill in the holes". The constraints are obtained from the 3D models. For example, in order to determine 'n' unknown parameters of a linear system, 'n' measurements must be made. If 'n–m' measurements are made the system is underdetermined, but can be solved if 'm' constraints are added. In this way the 3D model acts to regularize the reconstruction of the 3D image using sparse data. For example, the model might exclude density in void regions.

Optical Critical Dimension (OCD) Examples and Hybrid Examples

Figure 4:
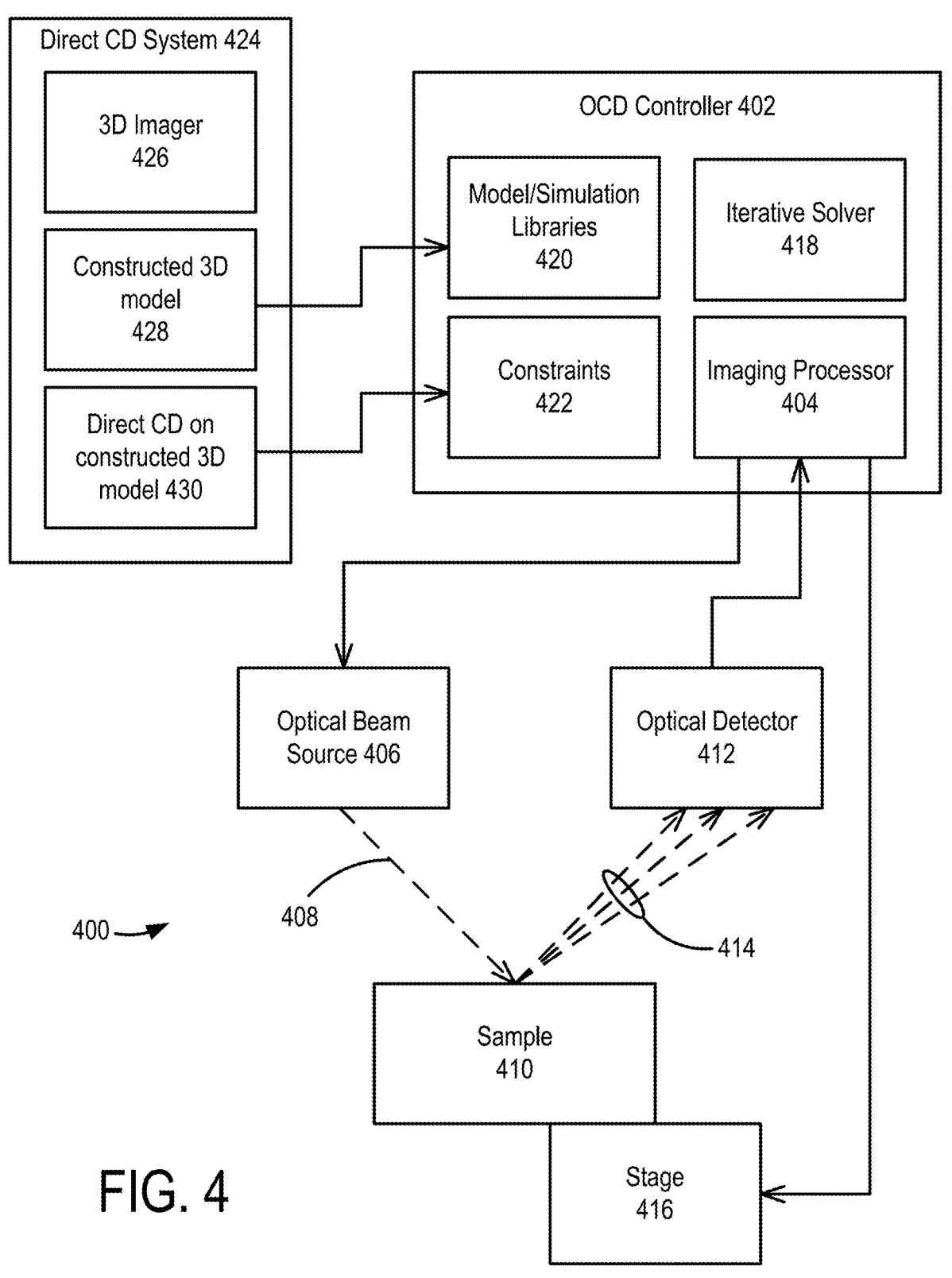
FIG. 4 is a schematic of an optical critical dimension (OCD) measurement system.

Critical dimensions acquired through an OCD process are a high throughput average of many 3D structures within an illumination area, whereas the direct 3D volume critical dimensions are of a single point measurement. OCD data are poor by comparison to 3D or 4D volume data, which allow rich metrology data of multiple unaveraged independent units. Both techniques complement each other but can be based on the same underlying model in disclosed examples herein. FIG. 4 shows such an example, in the form of an OCD system 400, which can improve the richness of OCD measurements by using 3D volumetric data obtained through direct methods. The system 400 includes an OCD controller 402 having one or more imaging processors 404 configured to direct operation of the system 400. For example, the imaging processor 404 is coupled to control operation of an optical beam source 406 which generates and directs a probe beam 408 to a sample 410 under metrology test.

An optical detector 412 is situated to receive a response beam 414 from the sample 410 in response to the interaction of the probe beam 408 with the sample 410. The response beam 414 can include various types of response light, such as diffracted, scattered, reflected, and/or polarized light. The OCD system 400 can be of various forms, including scatterometers and ellipsometers. The OCD controller 402 can also control a stage 416 supporting the sample 410 and can be configured to move the sample 410 in one or more directions to scan the probe beam 408 across the sample 410. In further examples, the sample can be fixed or movable 410 and the optical beam source 406 and optical detector 412 can be movable to produce scanning.

The characteristics of the detected response beam 414 (in the form of response beam data) can be closely associated with the structure of the sample 410 and the characteristics of the probe beam 408. Thus, in OCD processes, the response beam data can be used to analyze the structure that produced the detected response beam 414. This analysis can be performed directly on the response beam data, e.g., with a numerical solver 418 configured to iteratively solve an inverse nonlinear optimization problem according to various techniques, such as rigorous coupled-wave analysis (RCWA), finite element modeling (FEM), finite-difference time-domain method (FDTD), etc. Alternatively, simulated response beam data can be obtained by solving a forward problem simulating response beams expected to be produced from different modeled shapes. The simulated response beam data can be stored in a library 420 and the detected response beam data can be compared against the simulations to determine a match. Typically, numerous simulations are performed and stored so that they can be compared against response beam data, with the quantity of the simulations typically relating to the number structural parameters that can vary in the targeted structure and the range of variation. Example structural parameters can include a sidewall angle, height, depth, diameter, thickness, material type, pitch, etc. In accordance with disclosed examples, additional parameters associated with more complex 3D structures also can be simulated and varied.

However, because the OCD problem is generally underdetermined, i.e., without a unique solution, characteristics of the detected response beam 414 can also describe numerous other structures that are distinctly different from structure of the sample 410. To avoid spurious local minima in the reconstruction optimization (or to perform simulations), general characteristics of the sample structure should be known and structural characteristics that can parametrically vary should also be inferred. The characteristics of the sample can be described using a model, which can be stored in the library 420. Variable parameters can be stored as constraints 422. As both the accuracy of the model describing the structure of the sample 410 and the knowledge of the parameters of the structure that can be expected to vary increases, the accuracy of the OCD results increases and the computational difficulty in obtaining the OCD results decreases.

A direct CD system 424 can be configured with a 3D imaging system 426, such as an electron tomography, EDX system, or another 3D imaging system described herein. The 3D imaging system 424 can collect a series of images and then form 3D reconstructions, such as 3D reconstructions of structures on the sample 410 or a related sample. The direct CD system 424 can construct 3D models 428 of the imaged structures and also produce direct CD measurements 430 of the 3D model. As discussed above, without a suitable model and constraints to limit the forward or inverse OCD problem, OCD measurements can be inaccurate or related numerical problems can be computationally impractical. The constructed 3D model 428 can richly describe the structural characteristics of the sample 410. Thus, the constructed 3D model 428 can be sent to the OCD system 400, e.g., stored in the library 420, so that it can be used as a model for producing simulated response beam data for fitting against collected OCD response beam data. Further, CD measurements 430 performed on the constructed 3D model 428 can be used to determine the parameter constraints 422. By using the direct CD measurements 430 as the constraints 422, an improved set of response beam data simulations in the library 420 for OCD-based comparisons and corresponding OCD measurements of the sample 410 can be obtained. For example, the parameter constraints 422 obtained through the direct CD measurements 430 can be used in the response beam data selection process to narrow or refine the set of simulated response beam data, or the quantity and characteristics of simulation iterations that are numerically solved, to arrive at an accurate CD measurement.

FIG. 5 are example methods 500 of OCD measurements and linking direct CD and OCD measurement systems. At 502, a 3D model of a sample is constructed. The 3D model can be constructed by obtaining images of a volume of a sample, such as with an electron microscope, reconstructing the volume to form a 3D image, and fitting various geometric primitives to the sample. At 504, the CD of the sample can be estimated by performing CD measurements on the constructed 3D model or 3D image. In a separate OCD system, at 506, OCD response beam measurements of a separate (or the same) sample are obtained. At 508, CD measurements of the sample can be obtained using OCD by analyzing the OCD response beam measurements, e.g., by comparison with simulated OCD response beam data obtained using a suitable model and constraints. In some verification examples, at 510, the CD measurements obtained from the constructed 3D model can be optionally compared with the CD measurements obtained from the OCD system, e.g., in order to confirm an accuracy of the OCD based CD measurements relative to the directly obtained CD measurements. In some examples, the constructed 3D model and/or the CD measurements obtained for the 3D model or 3D image can be sent to the OCD system to improve the CD measurements obtained with the OCD system.

Figure 7:
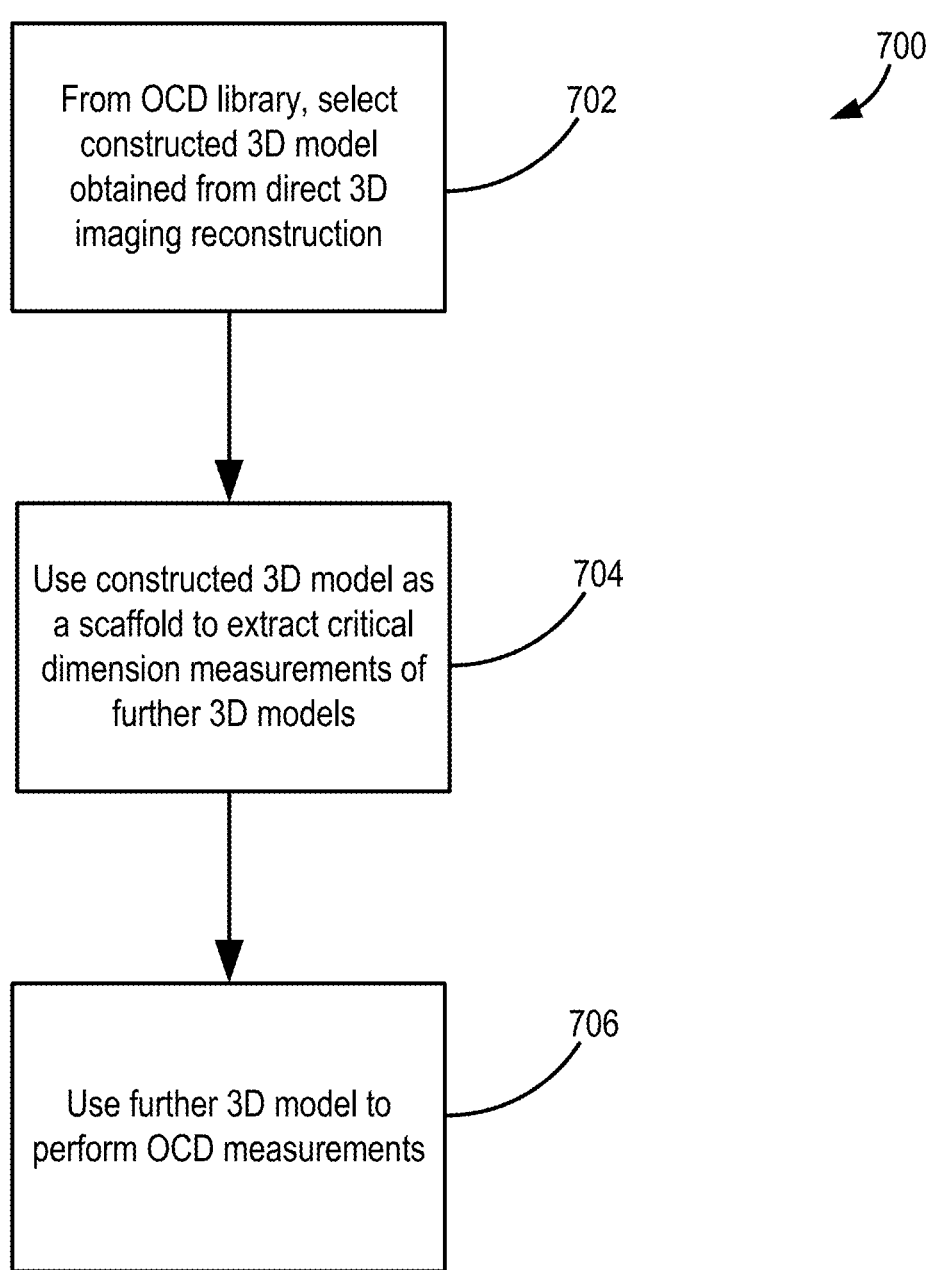
FIG. 7 is a flowchart of a method of extending 3D models as a scaffold to enhance OCD measurements.

FIG. 7 is another example method 700 of using a constructed 3D model as a scaffold for OCD measurements of new structures. At 702, a user or an automated process selects a constructed 3D model from a model library of an OCD system. The constructed 3D model can be obtained from a 3D imaging approach, such as electron tomography or other approaches described herein. At 704, the constructed 3D model can be used as a scaffold to extract critical dimension measurements of further 3D models. For example, the constructed 3D model can be fit to the further 3D models and critical dimension measurements extracted by measuring distances between further model geometric primitives, such as planes, using the constructed model as a template. At 706, the further 3D model can be used by the OCD system in performing OCD measurements, e.g., as a model for producing simulated OCD response beam data or constraints for simulations.

Figure 8:
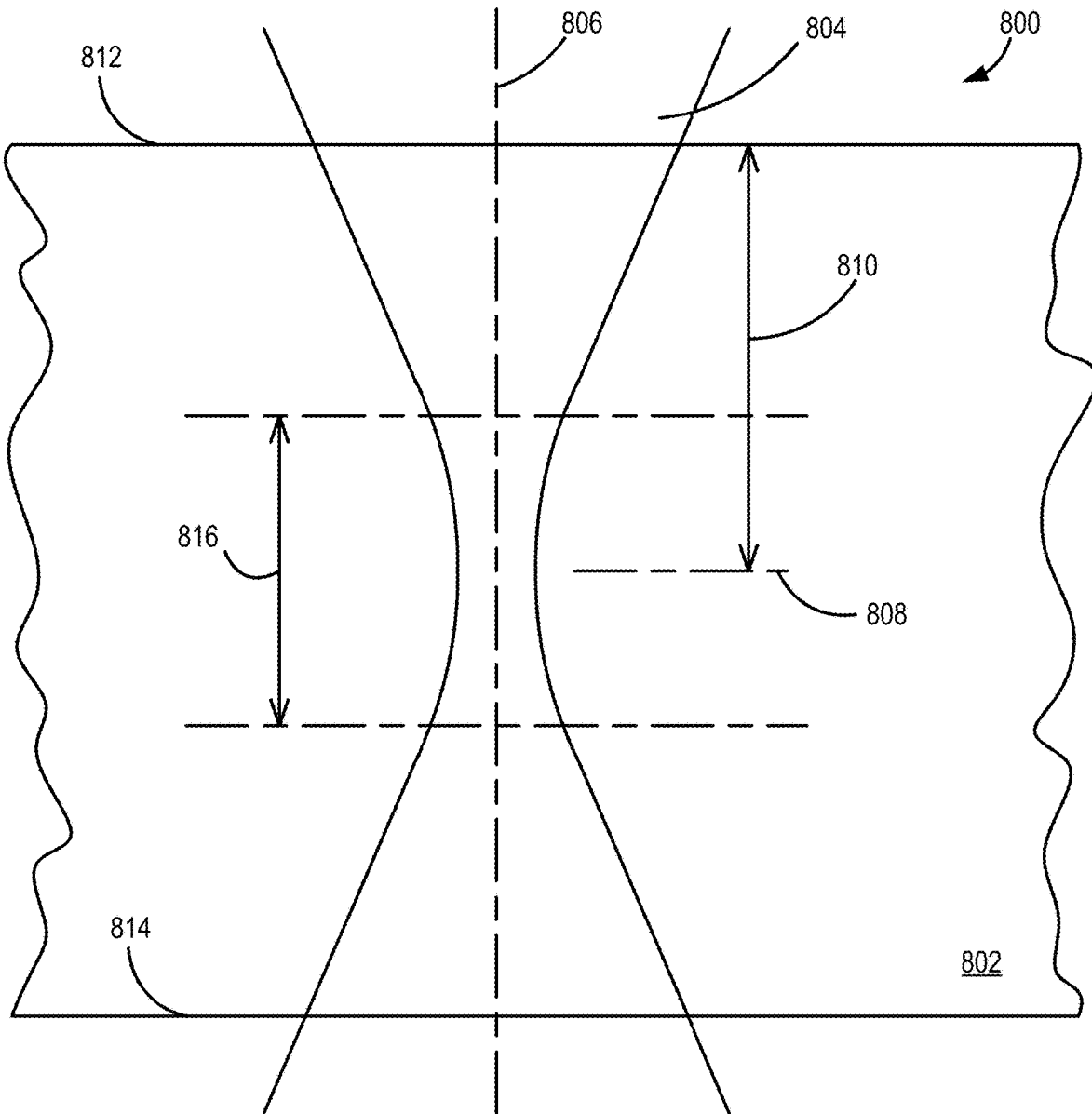
FIG. 8 is a schematic of an example computing system in which some described examples can be implemented.

FIG. 8 shows an example through-focus approach 800 where a sample 802 is probed with a focused probe beam 804. Through-focus approaches are another option for producing 3D images. The probe beam 804 is directed along a z-directional axis 806 to a focus 808 (e.g., a cross-over position in a STEM which can also define a beam waist 816) at a beam depth 810. In many through-focus examples, the beam 804 can be scanned from a surface layer 812 to a bottom layer 814 along the axis 806 by shifting the focus 808 to different beam depth positions along the axis 806. In some examples, scanning layer thicknesses as small as 1 nm or smaller are possible, though it will be appreciated that other thicknesses may be used. For each layer, various detection signals can be collected, such as integrated differential phase contrast (iDPC) with the thickness of the beam waist 816. With through-focus, an image with the focus 808 in the middle of the sample 802 can correspond to the projected potential of the beam 804 along the beam waist 816 at that depth. In some examples, 3D images can be constructed by stacking separate layer images.

Figure 9:
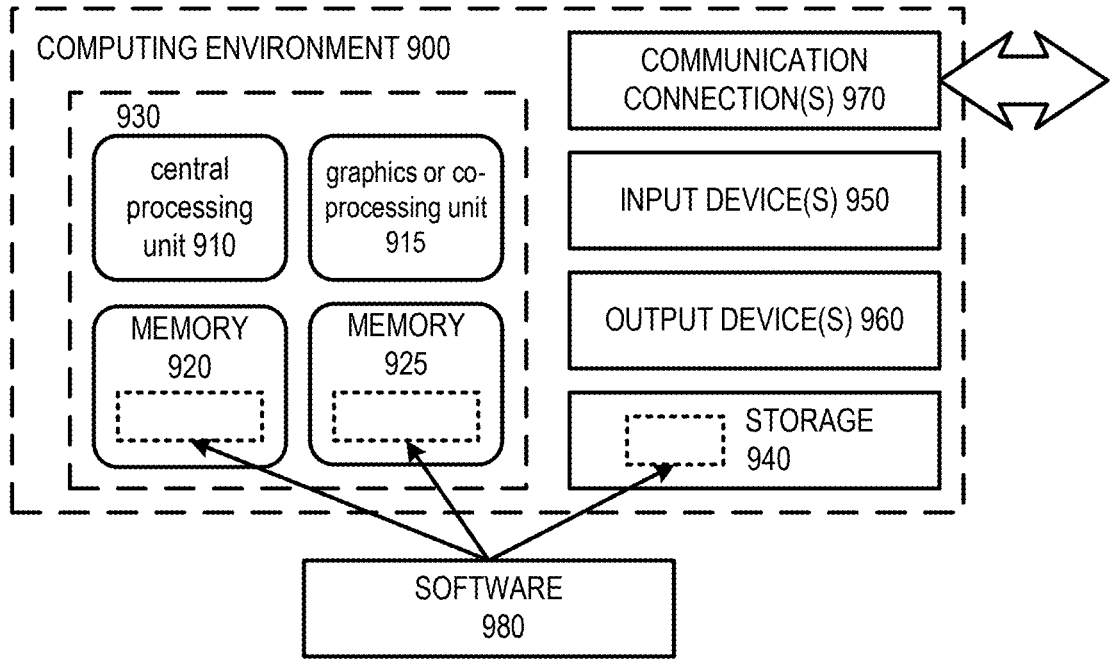
FIG. 9 is a schematic of an example cloud computing environment that can be used in conjunction with the technologies described herein.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing components of the computing environments of, or providing the data (e.g., 3D imaging data, CD data, simulation data, etc.) outputs shown in, FIGS. 1-8, described above. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900.

The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity, such as between direct CD and OCD systems. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 10:
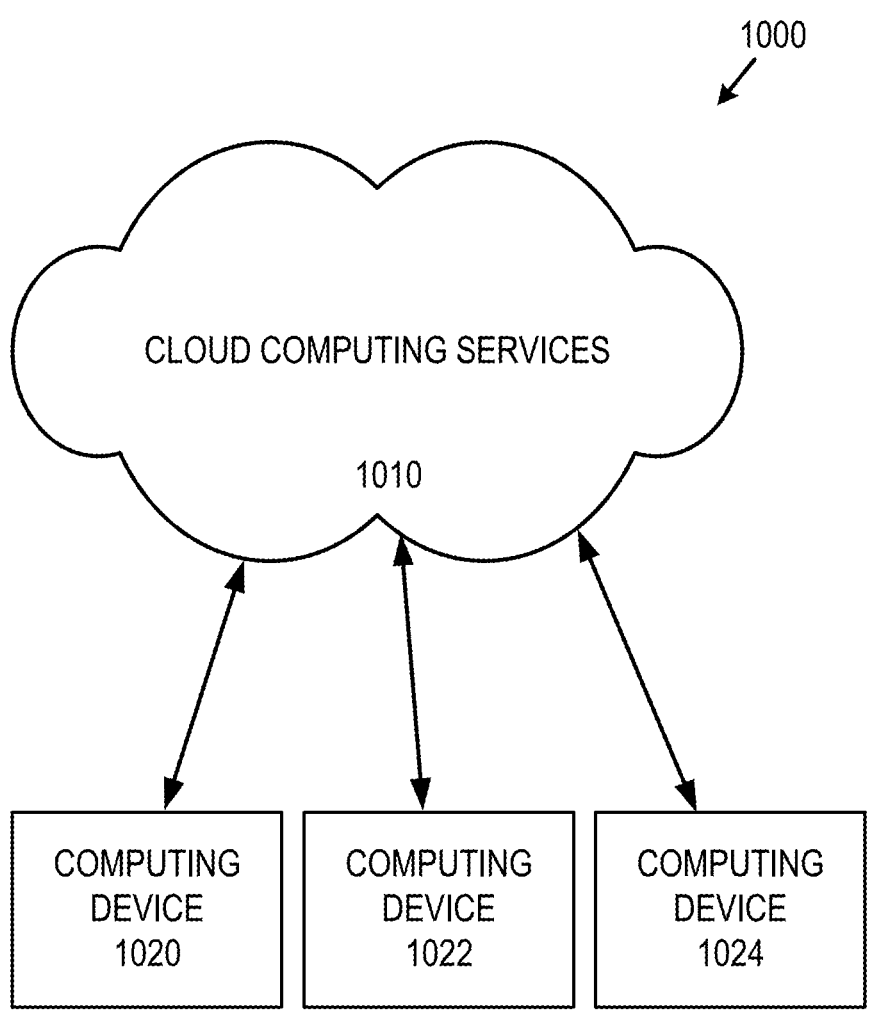
FIG. 10 is side view schematic of a through-focus approach being applied to a sample.

FIG. 10 depicts an example cloud computing environment 1000 in which the described technologies can be implemented. The cloud computing environment 1000 includes cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries). The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations, e.g., data processing (such as OCD model simulations/optimizations and/or 3D reconstructions), data storage (such as 3D image data, OCD data, models, constraints), and the like.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Described algorithms may be, for example, embodied as software or firmware instructions carried out by a digital computer. For instance, any of the disclosed image processing, 3D reconstructions, numerical analyses, and/or automation techniques can be performed by one or more a computers or other computing hardware that is part of a critical dimension metrology tool. The computers can be computer systems comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform any of the disclosed techniques. For instance, software for performing any of the disclosed embodiments can be stored on the one or more volatile, non-transitory computer-readable media as computer-executable instructions, which when executed by the one or more processors, cause the one or more processors to perform any of the disclosed techniques or subsets of techniques. The results of the computations can be stored in the one or more tangible, non-transitory computer-readable storage media and/or can also be output to the user, for example, by displaying, on a display device, 3D images, 3D models, critical dimensions, and/or image data.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. A method, comprising:
   acquiring a series of images or spectra of a volume of a model sample;
   reconstructing a 3D image of the volume of the model sample using the series of images;
   constructing a 3D model of the volume of the model sample by forming a segmentation of the reconstructed 3D image and fitting one or more primitive geometrical shapes to the segmentation;
   acquiring test sample images or spectra; and
   measuring test sample critical dimensions using the constructed 3D model to guide analysis of test spectra or images.

2. The method of claim 1, further comprising comparing the measured critical dimensions with CD measurements of the constructed 3D model to verify direct CD measurement accuracy.

3. The method of claim 1, further comprising measuring critical dimensions, shape, profile, and composition of the model sample from the series of images or spectra by measuring dimensions of the constructed 3D model.

4. The method of claim 1, wherein the acquiring the series of images or spectra of the volume of the model sample comprises, for each image of the series, adjusting parameters of an imaging beam at the model sample and/or parameters of a movement stage supporting the model sample and after each adjustment collecting the image with one or more image sensors.

5. A 3D direct metrology measurement system, comprising:

a movement stage;

a beam source configured to direct a beam to a model sample supported by the movement stage;

a sensor configured to receive particles from the model sample; and a processor coupled to the movement stage and sensor, the processor coupled to or including non-transitory code that, when executed by the processor, causes the system to:

acquire a series of images or spectra of a volume of the model sample;

reconstruct a 3D image of the volume of the model sample using the series of images;

construct a 3D model of the volume of the model sample by forming a segmentation of the reconstructed 3D image and fitting one or more primitive geometrical shapes to the segmentation; and measure critical dimensions of a test sample by:

acquiring one or more images of the test sample, identifying a portion of the one or more images of the test sample having a similarity with the constructed 3D model, and measuring critical dimensions (CD) of the test sample from the acquired images.

6. The system of claim 5, wherein the processor is coupled to or includes code that, when executed by the processor, causes the system to measure critical dimensions of a test sample by:

acquiring one or more images and/or spectra of the test sample, identifying a portion of the one or more images having a similarity with the constructed 3D model, and measuring critical dimensions (CD), shape, profile and material composition of test sample from the acquired images and spectra.

7. The system of claim 5, wherein the processor is coupled to or includes code that, when executed by the processor, causes the system to measure critical dimensions of the model sample at the location where the series of images and/or spectra was acquired by measuring dimensions of the constructed 3D model.

8. The system of claim 5, wherein the processor is coupled to or includes code that, when executed by the processor, causes the system to:

retrieve the constructed 3D model obtained from an optical critical dimension (OCD) model library; and adjust the primitive geometrical shapes of the constructed 3D model to correspond with a structure of an OCD test sample.

9. A non-transitory computer readable storage medium including stored processor-executable instructions configured to perform the method of claim 1.

\* \* \* \* \*